Sept. 1, 1942.  C. H. KÖHN  2,294,409
CATERPILLAR, IN PARTICULAR ROLLER CHAIN
Filed Nov. 14, 1940  2 Sheets-Sheet 1

INVENTOR
Claus Hinrich Köhn
BY
ATTORNEY

Sept. 1, 1942.                C. H. KÖHN                2,294,409
CATERPILLAR, IN PARTICULAR ROLLER CHAIN
             Filed Nov. 14, 1940        2 Sheets-Sheet 2
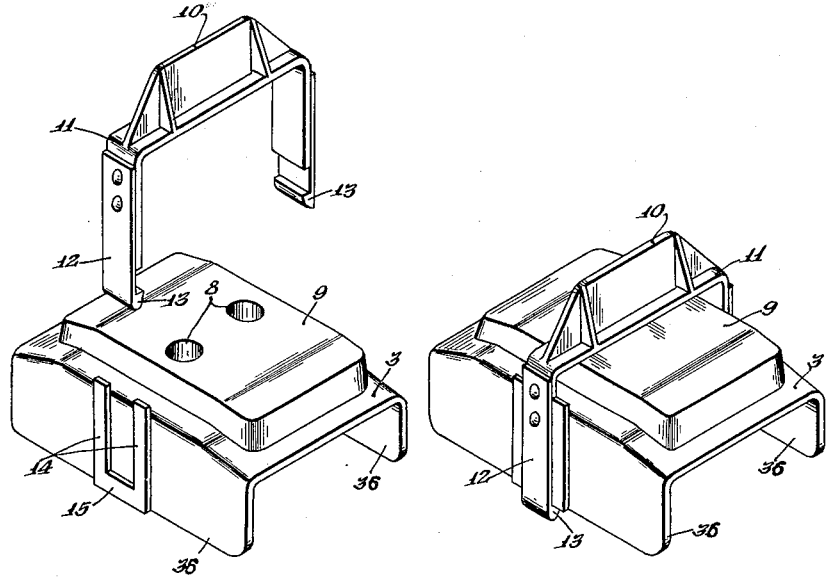
FIG. 4.          FIG. 5.
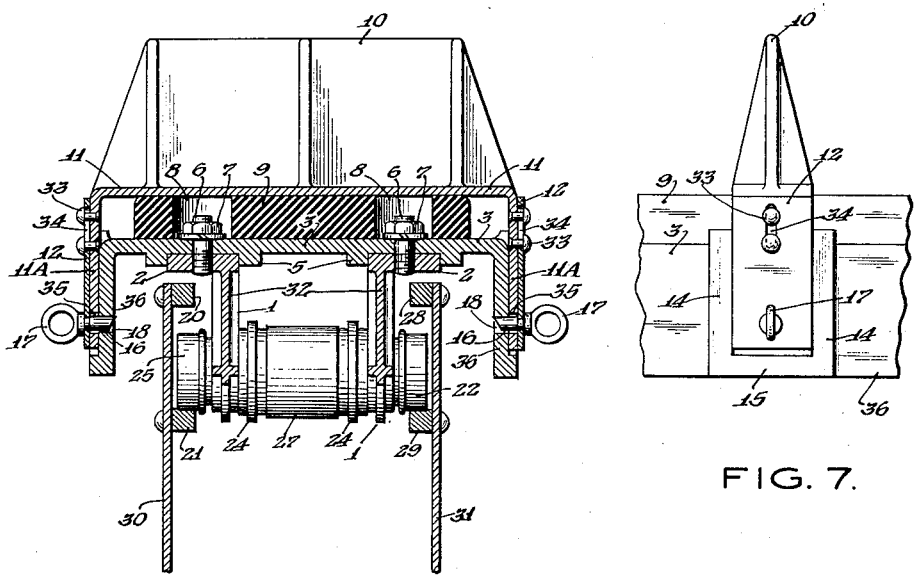
FIG. 6.
FIG. 7.
INVENTOR
Claus Hinrich Köhn
BY
ATTORNEY Patented Sept. 1, 1942

2,294,409

UNITED STATES PATENT OFFICE 2,294,409

CATERPILLAR, IN PARTICULAR ROLLER CHAIN

Claus Hinrich Köhn, Rapperswil, St. Gallen, Switzerland

Application November 14, 1940, Serial No. 365,614
In Switzerland August 31, 1939

7 Claims. (Cl. 305—10)

The invention refers to caterpillars, in particular roller chains, running on tracks or vehicles, provided with foot plates and removable grippers or lugs for propagating vehicles, such as tractors, tanks etc.

It is an object of the invention to simplify the construction of such caterpillars and roller chains.

It is another object of the invention to arrange the grippers or lugs easily detachable on the foot plates.

It is a further object of the invention to arrange the foot plates detachable from the roller chains without disassembling the tracks.

Figure 1:
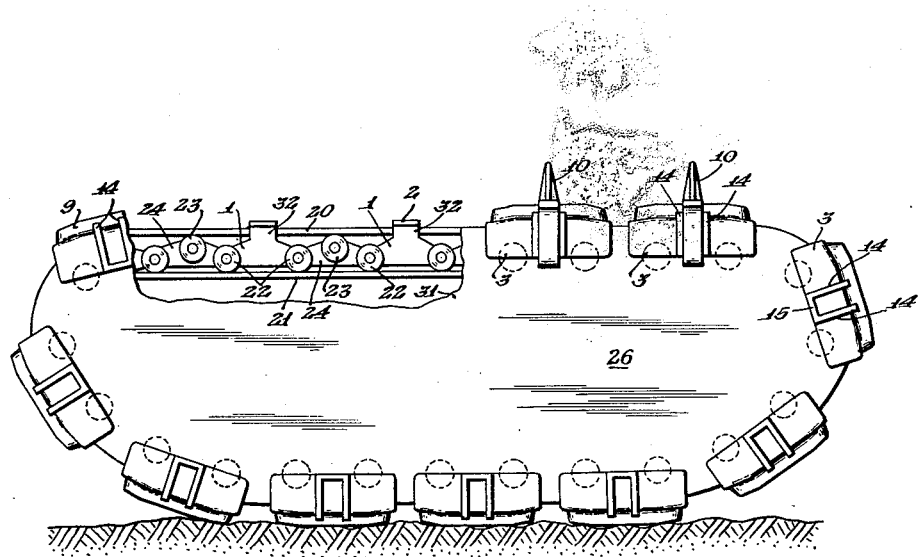
Figure 2:
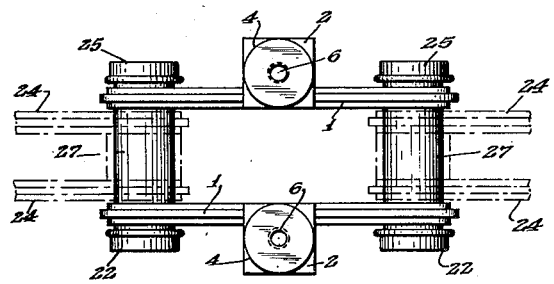
Figure 3:
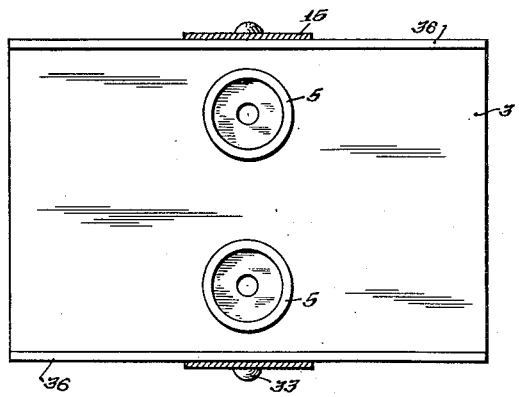

These and other objects of the invention will be more clearly understood when the specification proceeds with reference to the drawings in which Fig. 1 shows in side elevation and more diagrammatically a vehicle provided with a propagating roller chain according to the invention, a part of the front wall being broken away; Fig. 2 shows a plan view of a pair of links and connected joints; Fig. 3 a view from below of a foot plate; Fig. 4 perspective views of a foot plate and a gripper; Fig. 5 in perspective view a foot plate and gripper mounted thereon; Fig. 6 a cross-section through foot plate, gripper and links, and Fig. 7 a side view of the former.

Referring to Figs. 1, 2 and 6, a vehicle 26 provided with propagating roller chains on the sides is shown. Each caterpillar consists of a roller chain composed of rollers 22, 25 mounted on an axle 27 forming the joint for adjacent pairs of links 1, 24. The types of links 1 and 24 alternate; links 24 carry rollers 23 while links 1 carry foot plates and grippers. Due to the particular outwards bent shape of links 24, the rollers 23 run on the outside tracks 20, 28 while rollers 22, 25 run on the inside tracks 21, 29. The tracks form a closed path and are mounted on side walls 30, 31 which are rigidly connected with each other and the body of the vehicle 26 as well.

According to the invention, links 1 are provided, particularly formed in one piece with members 32 projecting outwardly beyond the rims of the side walls and tracks 20, 28 and ending in seating plates 2 for the foot plates 3. The seating and foot plates are provided with engaging parts; thus projecting rings 4 may be provided on plates 2 which snugly fit within flanges 5 on foot plates 3, Figs. 2, 3 and 6. Screws 6 are screwed or riveted into plates 2 and project through holes in foot plates 3 which are held on the seating plates by nuts 7 and interposed washers.

It will be appreciated from the above that the foot plates can easily be connected with and disconnected from the roller chain by means of these screws and nuts without disassembling the frame work of the tracks, as it has heretofore been necessary.

On top of the foot plates covers 9 are arranged and fastened to the foot plates, if desired, by screws (not shown) which do not protrude beyond the outer running surface of those covers.

In particular, the covers 9 may be resilient, such as of rubber reinforced by fabric layers, as well known in the manufacture of tires.

In the embodiments of the invention shown, the covers are provided with recesses or holes 8 within which the screws 6 and nuts 7 are arranged.

The grippers or lugs 10 are provided with rigid U-shaped base plates 11 the legs of which fit into or engage U-shaped frames 14, 15 provided on the side walls 32 of the foot plates, Figs. 3, 6 and 7. Springs 12 are attached to the legs of plates 11 by means of rivets 33 passing preferably oblong holes 34 of the springs so that, if desired, the latter can move relative to the legs of the base plate 11. A bolt 16 with handle 17 is fastened in spring 12 and snaps into hole 18 of the leg if the gripper with its base plate is pushed over foot plate 3 and cushion or cover 9.

It will be appreciated from the above that the gripper can easily be mounted on and removed from the foot plates, and that—if desired—a spring movement of it relative to the foot plate is established by the interposed cover 9, if it is resilient, and the slits 34, 35 in springs 12 and legs, respectively.

Instead of a bolt 16 and hole 18 connection, as shown in Figs. 6 and 7, spring 12 may be provided with an inwardly bent edge or paw 13, as shown in Figs. 4 and 5 which passes over and eventually snaps behind frame part 15 when the gripper is pushed into position over foot plate 3.

It should be understood that the invention is not limited to any particular exemplification as shown, but to be derived in its broadest aspect from the appended claims. Thus, instead of legs entering a U-shaped frame, other rigid guiding members engaging each other, such as dovetailed or grooved and each other complementing parts can be provided inside the legs and outside the side walls 36 of the foot plates. Instead of a frame 14, 15, a sleeve may be provided into which a bolt-like portion of the legs of the base plate 11 fits snugly.

What I claim is:

1. A roller chain provided with foot plates and grippers or lugs, for propagating vehicles, comprising links provided with projecting members, foot plates seated on top of said members, means for removably connecting said foot plates and members, grippers provided with a base plate to be seated on said foot plates and having lateral members adapted to be slipped over and engage said foot plates, and removable means for fastening said base plate on said foot plates.

2. A roller chain provided with foot plates and grippers or lugs, for propagating vehicles, comprising links provided with projecting members, foot plates seated on top of said members, means for removably connecting said foot plates and members, cover means on top of said foot plates, grippers provided with a base plate to be seated on said cover and having lateral members adapted to be slipped over and engage said foot plates, and removable means for fastening said base plate on said foot plates.

3. A roller chain provided with foot plates and grippers or lugs, for propagating vehicles, comprising links provided with projecting members, foot plates seated on top of said members, means for removably connecting said foot plates and members, resilient cover means on top of said foot plates, grippers provided with a base plate to be seated on said cover and having lateral members adapted to be slipped over and engage said foot plates, and removable means for fastening said base plates on said foot plates.

4. A roller chain provided with foot plates and grippers or lugs, for propagating vehicles, comprising links provided with projecting members, foot plates seated on top of said members, means for removably connecting said foot plates and members, grippers provided with a base plate to be seated on said foot plates and having lateral members adapted to be slipped over and engage said foot plates, and springy means for fastening said base plates on said foot plates automatically and removably.

5. A roller chain provided with foot plates and grippers or lugs, for propagating vehicles, substantially comprising links provided with projecting members, foot plates seated on top of said members and provided with side walls receding from the outside bearing surface of said plates, means for removably connecting said foot plates and members, grippers provided with a base plate to be seated on the bearing surface of said foot plates and having lateral members adapted to be slipped over and engage said side walls, and removable means for fastening said lateral members on said side walls.

6. A roller chain provided with foot plates and grippers or lugs, for propagating vehicles, substantially comprising links provided with projecting members, foot plates seated on top of said members, means accessible from the outside of said foot plate for removably connecting the latter with said members, grippers provided with a base plate to be seated on said foot plate and having lateral members adapted to be slipped over and engage said foot plates, and removable means for fastening said lateral members on said foot plates.

7. A roller chain provided with foot plates and grippers or lugs, for propagating vehicles, substantially comprising links provided with projecting members, foot plates seated on top of said members and provided with side walls receding from the outside bearing surface of said foot plates, means accessible from the outside of said foot plate for removably connecting the latter with said members, resilient cover means on top of the bearing surface of said foot plates and provided with recesses for making accessible from the outside said connecting means, grippers provided with a base plate to be seated on said cover and having lateral members adapted to be slipped over and engage said side walls, and removable means for fastening said lateral members on said side walls.

CLAUS HINRICH KÖHN.